March 20, 1951  C. F. SCHMARJE ET AL  2,545,708
BUTTON BLANK CUTTING MACHINE
Filed March 15, 1946  3 Sheets-Sheet 2
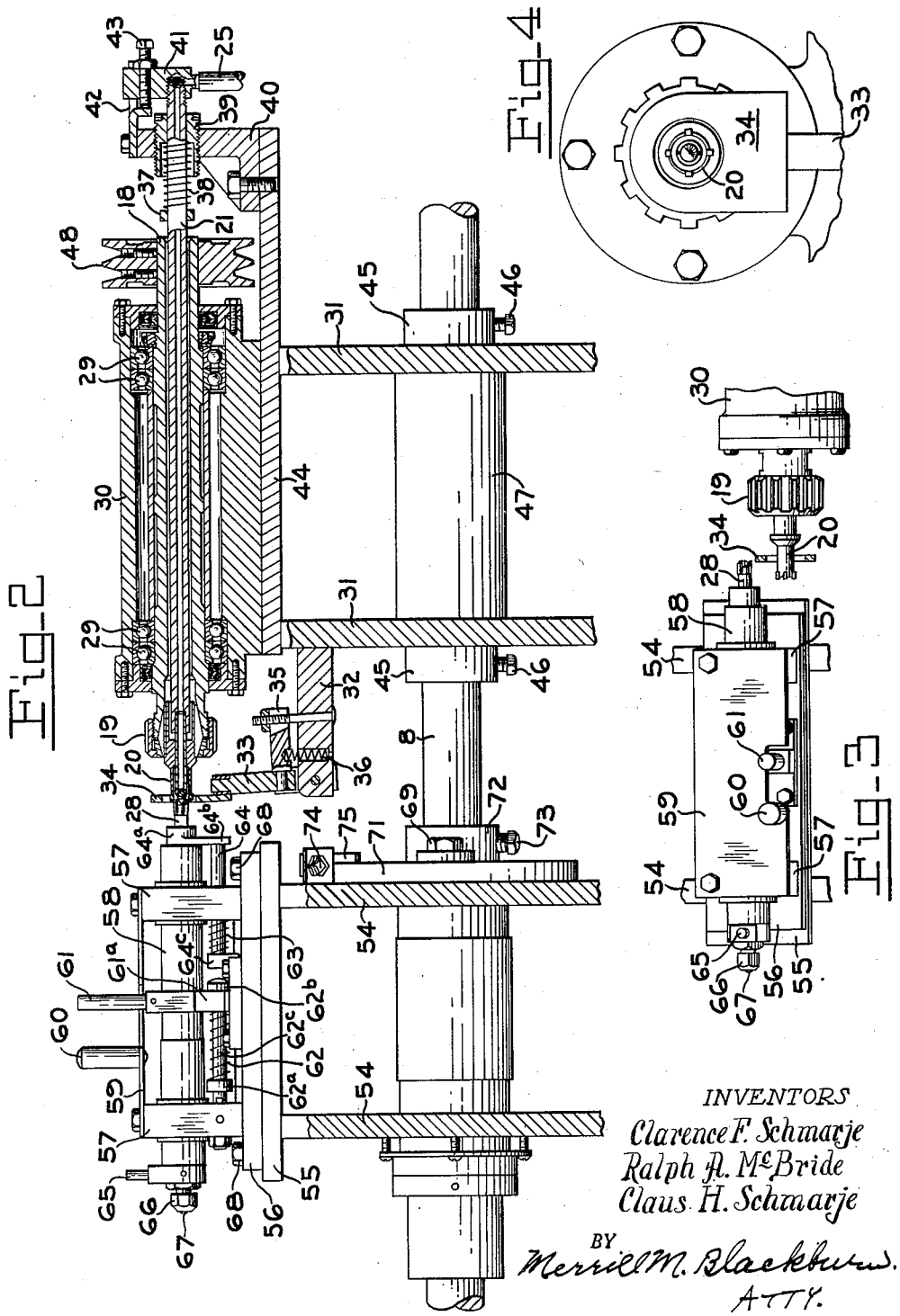
INVENTORS
Clarence F. Schmarje
Ralph A. McBride
Claus H. Schmarje
BY Merrill M. Blackburn
ATTY.

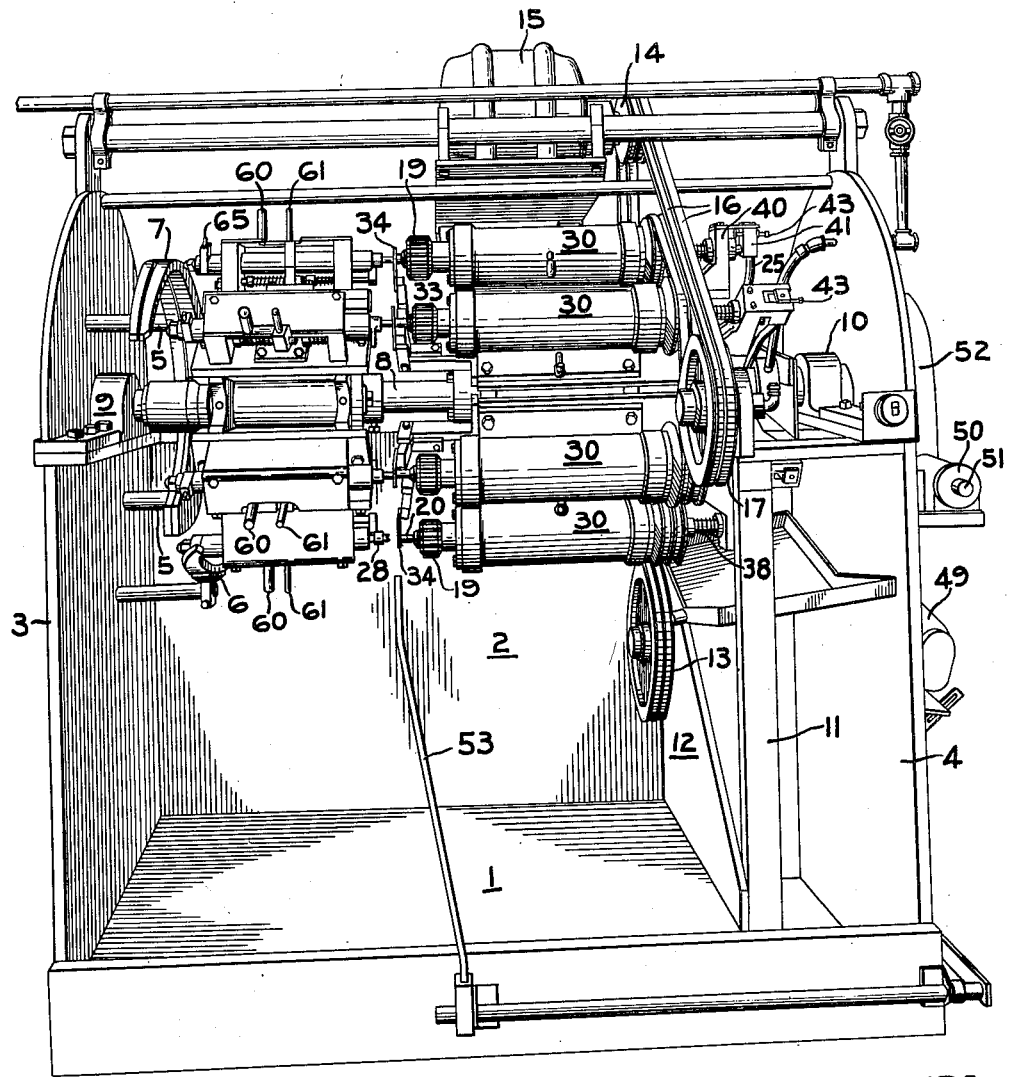

March 20, 1951 C. F. SCHMARJE ET AL 2,545,708
BUTTON BLANK CUTTING MACHINE
Filed March 15, 1946 3 Sheets-Sheet 3
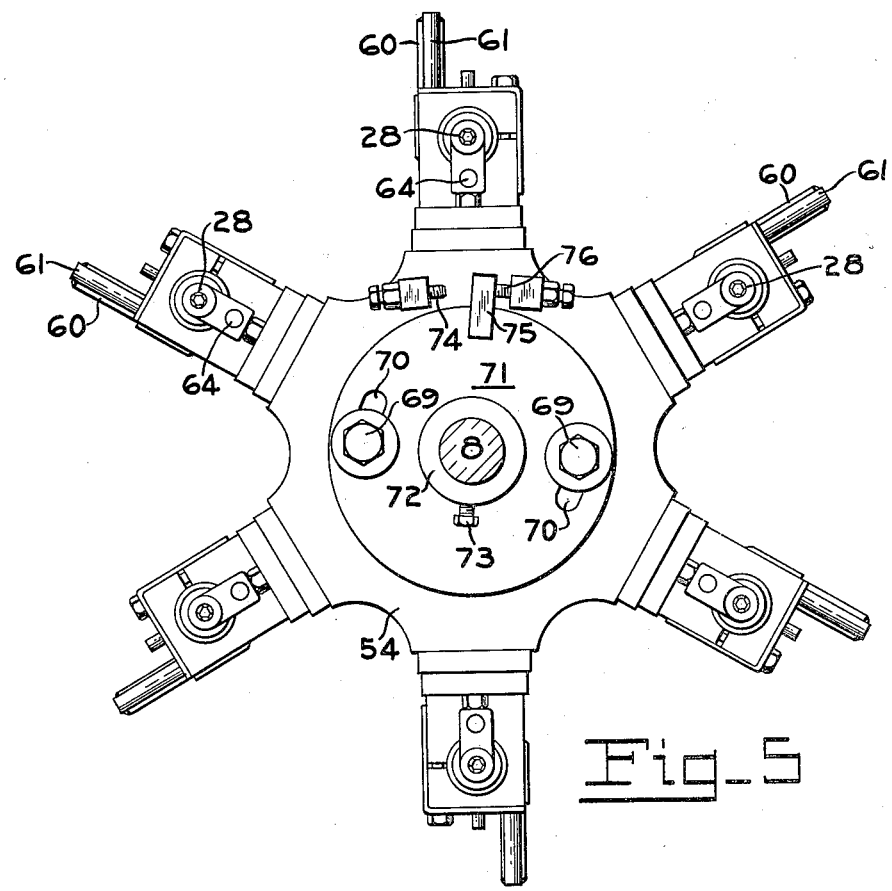
Fig_5
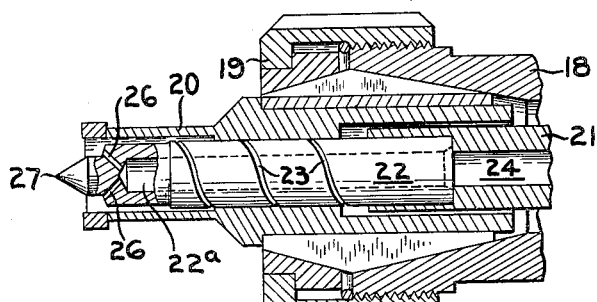
Fig_6
INVENTORS
*Clarence F. Schmarje*
*Ralph A. McBride*
*Claus H. Schmarje*
BY
*Merrill M. Blackburn.*
ATTY.

Patented Mar. 20, 1951

2,545,708

UNITED STATES PATENT OFFICE 2,545,708

BUTTON BLANK CUTTING MACHINE

Clarence F. Schmarje, Ralph A. McBride, and Claus H. Schmarje, Muscatine, Iowa, assignors to Ronda Button Company, Muscatine, Iowa, a corporation of Iowa Application March 15, 1946, Serial No. 654,700

13 Claims. (Cl. 79—16)

Our present invention relates to the art of making button blanks from mollusk shells and more particularly to an improved machine for that use. Among the objects of this invention are the provision, in a machine of the type indicated, of improvements which will facilitate the removal of a saw and the substitution of a new one when the saw is injured or dulled; the provision of improved means for feeding water to the work when cutting is being accomplished; the provision of means whereby a substantially constant pressure is maintained on the shell during the entire cutting operation; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Fig. 1 represents a front elevation of our machine according to this invention;

Fig. 2 represents a longitudinal, vertical section therethrough;

Fig. 3 represents a fragmentary plan view of one unit of this machine showing a saw partly removed;

Fig. 4 represents a fragmentary end elevation of a part of the machine;

Fig. 5 represents an end elevation showing how certain normally aligned parts are moved out of alignment for removal or replacement of a saw; and Fig. 6 represents a longitudinal section of the forward end of a shell-cutting member, showing how water is kept from backing up around the spindle and out of the back end of this machine.

Reference will now be made in greater detail to the annexed drawings for a more complete description of this invention. The supporting body of this machine comprises the bottom 1, the back 2, and ends 3 and 4. Secured to the inside face of the end 3 are posts 5 which serve to support cam means for actuating parts of the movable means of the machine. On one of these parts is mounted a cam 6 and on others a cam 7. The main supporting shaft 8 is mounted in bearing members 9 and 10, and on this shaft 8 are mounted two frames carrying operative mechanisms which hold the mollusk shells and perform the cutting operations.

Inside of the supporting body is supporting means 11 to which is secured a plate 12, also secured to the back of the machine. A double V pulley 13 is mounted on the plate 12 and has a pair of V belts passing therearound and up to a belt pulley 14 on the shaft of motor 15. The belts 16 pass first around a pulley 17 and then around a plurality of pulleys 48 which are connected in operative relation with hollow shafts or pipes 18 carrying chucks 19 which hold the saws 20 used in cutting the blanks out of the shells. Each hollow shaft 18 has another hollow shaft 21 running longitudinally therethrough, and this carries at its forward end a plug, as shown in Fig. 6, with a spiral groove 23 about the outer surface thereof. This plug 22 is hollow and the hollow thereof, shown at 22a, communicates with the longitudinal channel 24 of the hollow shaft 21. As shown in Fig. 2, a pipe 25 carries water to the entrance end of the pipe 21. The plug 22 has a pair of openings 26 which carry water from the interior of the plug and direct it at the area of the shell where the cutting is being done. This plug 22 has a single point 27 for engaging the shells and holding them against the holding members 28.

The pipes 18 are carried by bearings 29 carried inside of the supporting drums 30, which hold the pipes, chucks, and saws in operative position. Since a shell is held in front of a saw by a point 27 and there is an open space around the plug 22, between it and the saw 20, water deflected from the shell may enter this hollow space. In order to keep the water from working back through the saws and around the outside of the pipes 21, the spiral grooves or channels 23 are provided on the outside of the plugs 22, and they serve to force the water outwardly, thus preventing it from working backwardly and being discharged at the rear end of the pipes 18.

Mounted on the supporting frame 31 for the drums 30 is a bracket 32 which has an arm 33 pivotally connected thereto, which arm carries at its upper end an apertured plate 34, the purpose of which is to prevent the shell from remaining on the saw after the blank has been severed therefrom. An arm 35 is connected to the arm 33 and this is engaged by a spring 36 which raises the arm 35 and moves the plate 34 forwardly, whereby to strip the shell from the saw.

The rear end of the pipe 21 is surrounded by a collar 37 which is secured thereto, and this is engaged by a spring 38, the second end of which is seated in a socket in a screw-threaded plug 39 which may be adjusted in the bracket 40 to vary the spring pressure on the pipe 21 and, consequently, on the holding point 27. As the shell holder 28 is moved forwardly to press the shell against the saw, the plug 22 and pipe 21 are forced rearwardly, compressing the spring 38 between the collar 37 and the plug 39. This gives a yieldable holding pressure on the shell so that the latter will not be cracked by too much pressure during the cutting operation. A block 41 secured to the end of pipe 21 has a sliding connection with the bracket 42 and slides with relation thereto as the spring 38 is compressed. An adjustable stop screw 43 is mounted in the block 41 and may be adjusted to limit the forward motion of the holding point 27 to the desired amount.

The drums 30 are secured to the supporting plates 44 which form a part of the support of which the plates 31 also form part. The plates 31 are held in place on the shaft 8 by the collars 45, screws 46, and sleeve 47, as will be obvious from Fig. 2. It is clear from Figs. 1 and 5 that there are six of the drums 30 and corresponding saws 20, and the same number of cooperating shell holders 28. When current is fed to the motor 15, this results in the belts 16 being driven, and these engage and drive the pulleys 48 mounted on and secured to the hollow shafts 18. This causes the saws to rotate simultaneously as they revolve about the main shaft 8. This main shaft is driven from a motor 49 which is connected to the belt pulley 50 by a belt, not shown. The pulley 50 is mounted on the worm shaft 51 which cooperates with the worm wheel in the housing 52, and this worm wheel is in turn connected to the main drive shaft. The clutch for causing driving of the shaft 8 has a worm wheel in the housing 52 and is operated by the handle 53 at the front of the machine.

A pair of plates 54, having radially projecting arms, as shown in Fig. 5, are secured to the main shaft 8 and revolve about this. On the outer end of each pair of arms is a shelf 55 to which is secured a plate 56 and on this plate are posts 57 which support the carriers 58 by which the shell supports 28 are carried. Connecting the tops of the posts 57 are plates 59, each supporting a handle 60 which assists in the manipulation of the handle 61, by means of which the shell-holders 28 may be retracted.

The spring 62 bears at one end against the collar 62a and, at its other end, against the base portion 61a of the finger piece or handle 61 and pushes the latter to the right until the part 61a engages the head 62b of the rod 62c which is adjustably fastened in the base portion of the post 57. The finger piece 61, 61a is clamped to the support 58 and therefore moves with it, longitudinally.

As is clear from Fig. 2, the springs 62 press the shell-holders 28 toward holding position but these may be retracted by pressing the finger piece 61 toward the handle 60. The rod 64, passing through the post 57, against which the spring 63 presses, is connected to the collar 64a by the arm 64b. It is clear that the supporting unit 58 for the shell-holder 28 slides longitudinally through the two posts 57. A pin 65 is attached to the outer end of each unit 58 and this pin extends radially outwardly to engage the laterally outer or cam surface of the cam 6 when the rotation of the shaft 8 and plates 54 carries the pins 65 downwardly and rearwardly into engagement with the outer end of the cam 6. As the shaft 8 and plates 54 continue their rotation, the laterally outer edge of the cam 6 acts against the moving pins 65 to shift them to the left, as viewed in Fig. 1, with the result that the support 58 is withdrawn from holding position when the shell has been carried around by rotation of the holding cage, consisting of the six shell-holders 28, carriers 58, and the associated parts. This releases the shell which is pushed away from the saw 20 by the plate 34, thus permitting the shell to drop to the bottom or floor 1 of the machine. When the pin 65 clears the end of the cam 6, the spring 62 forces the support 58 and shell-holders 28 toward the saw. Then, as the cage continues to revolve, the saw and shell-holder are brought up in front of the operator who takes hold of the pins 60 and 61, pressing them together so as to separate the holder from the saw. When this is accomplished, a shell may be positioned between the saw and holder. Then, when the pin 61 is released, the shell is forced against the apertured plate 34 which is pushed back so that the shell is permitted to engage the saw.

As indicated above, the shell-holder 28 is surrounded by a collar 64a which has an arm 64b projecting therefrom, which arm is connected to the end of the rod 64. As the support 58 is pulled back by the finger 65 engaging cam 6, collar 64a and rod 64 move back until the head 64c engages the head 62b which acts as a stop for the collar. As the support 58 continues to move back, the collar 64a is slid lengthwise of the holder 28 or, expressed differently, the holder 28 is withdrawn within the collar 64a, resulting in the shell from which the button blank has been cut being stripped from the holder and being dropped to the bottom or floor 1 of the machine. It will thus be seen that the plate 34 strips the shell from the saw, and the collar 64a strips it from the shell-holder 28.

A nut 66 holds a ball 67 upon the end of support 58, with the ball projecting slightly beyond the face of the nut. As the cage rotates, the ball 67 is brought into contact with the edge of the cam 7 which forces the support 58 to the right, as viewed in Figs. 1 and 2, thus causing the shell-holder 28 to force the shell against the saw 20, resulting in the cutting of a groove in the shell, freeing the button blank from the shell material before the pin 65 engages the cam 6. Therefore, the shell and blank are dropped substantially simultaneously to the floor of the machine when the shell-holder is withdrawn.

It is obvious that when the saw and shell-holder are axially aligned, as in Fig. 1, it is practically impossible to remove the saw for repair, sharpening, or replacement, unless the bolts 68 are removed so that the parts supported by the plate 56 can be removed. In order to avoid the necessity for this, bolts 69 pass through slots 70 in plate 71 and into plate 54. The plate 71 is secured to the shaft 8 by a collar 72 and set screw 73. By loosening the bolts 69, it is possible to rotate the plates 54 about the shaft 8 until the stop member 74 engages the side of the arm 75 on plate 71. This gets the shell-holders 28 out of alignment with the saws 20 so that by loosening the appropriate chuck 19, the saw can be withdrawn from the chuck for such treatment as may be needed. After the saw has been replaced, the plate 54 is rotated in the opposite direction until the arm 75, withdrawn from the stop 76, engages the stop 74, bringing the shell-holders 28 again into alignment with the saws 20. The bolts 69 are then tightened up to hold the parts in adjusted position.

It is believed that the operation of this machine has been sufficiently clearly set forth above that it is not necessary to re-state it.

It is of course understood that the specific description of structure set forth above may be departed from without departing from the spirit of this invention as disclosed herein and as defined in the appended claims.

Having now described our invention, we claim:

1. A button blanking machine having a supporting framework and a main shaft; comprising two pairs of supporting plates mounted on and rotated by said shaft, one pair of said pairs of plates carrying a group of supporting tubular members, the other pair of said pairs of plates carrying a second group of supporting tubular members, said groups of tubular members normally being axially aligned in cooperating pairs, shell-holding members in the tubular members of said one group, circular saws in the tubular members of said second group, said shell holders and saws being carried in said axially aligned pairs of tubular supporting members, one pair of said plates being adjustable about said main shaft to carry the shell-holders and saws out of alignment whereby to enable the saws to be removed from their supporting tubular members, and securing means to hold said one pair of plates in properly adjusted position so that the shell-holders and saws are properly aligned for cutting button blanks.

2. In a blanking machine, supporting means for supporting shell-holding means and a circular saw in axially aligned relation, said shell-holding means being reciprocable toward and away from the saw, and a second shell-holding means reciprocable within the saw and projecting at its ends beyond the saw and its supporting means, the second shell-holding means having a spring associated with its end remote from the saw for holding the protruding end beyond the saw, said spring being adapted to yield under pressure by the other shell-holder in excess of the pressure exerted by said spring, whereby to insure that there will not be excessive pressure exerted on the shell by the first mentioned shell-holder.

3. In a button blanking machine, the combination of a main shaft and its supporting means, a pair of cams carried by said supporting means, a plurality of shell-holding means carried by said main shaft and reciprocable axially by said cams, stripping means in connection with each of said shell-holding means for stripping shells therefrom after button blanks have been cut from the shells, a circular saw axially aligned with each shell-holding means and adapted to be rotated about the axis of the two, and spring-actuated means for stripping shells from the saws after the cutting of button blanks from the shells, one of said cams serving to press a shell-holding means toward one of the saws and the other serving to retract a shell-holding means from the last mentioned saw.

4. In a button blank cutting machine, a rotary saw for cutting button blanks from mollusk shells, said saw being supported for rotary movement only, a hollow shaft for supporting said saw, shell-holding means extending through the hollow of the hollow shaft, said shell-holding means, when the machine is not functioning in the cutting of blanks, extending beyond both ends of the hollow shaft and having a spring urging it to extend beyond the saw when it is free to move in that direction, an externally screw-threaded abutment member against which the spring bears, said abutment member having its forward end hollow and receiving within the hollow one end of said spring, said screw-threaded member being adjustable longitudinally with relation to the shell-holding means whereby to vary the resistance of the shell-holding means to pressure in the opposite direction, and an adjustable stop for limiting the forward motion of the shell-holding means to selectively variable extents.

5. In a button blanking machine, a main supporting and driving shaft, a pair of cages mounted thereon, each cage comprising a pair of supporting plates and a plurality of operative mechanisms carried upon the periphery thereof in spaced relation around the edges of said plates, the operative mechanisms of the two cages being related to each other, end to end, in cooperating pairs, the operative mechanisms of one cage including tubular supporting means, longitudinally reciprocable with reference to said plates and carrying shell-supporting means which may be moved into and out of engagement with a shell adjacent the holding face of the shell-holding means, the operative mechanisms of the other cage including fixed tubular supporting means, rotary, tubular, supporting means extending therethrough and projecting therefrom at both ends, a longitudinally reciprocable, tubular, fluid-carrying, shell-supporting means extending through said rotary, tubular, supporting means, and spring means for pressing the second shell-holding means toward the first shell-holding means.

6. In a button blanking machine, a main supporting and driving shaft, a pair of cages mounted thereon, each cage comprising a pair of supporting plates and a plurality of operative mechanisms carried upon the periphery thereof in spaced relation around the edges of said plates, the operative mechanisms of the two cages being related to each other end to end, in cooperating pairs, the operative mechanisms of one cage including tubular supporting means, longitudinally reciprocable with reference to said plates and carrying shell-holding means which may be moved into and out of engagement with a shell adjacent the holding face of the shell-holding means, the operative mechanisms of the other cage including non-rotary tubular supporting means, rotary, tubular, supporting means extending therethrough and projecting therefrom at both ends, a longitudinally reciprocable, tubular, fluid-carrying, shell-supporting means extending through said rotary, tubular, supporting means, spring means for pressing the shell-supporting means toward the shell-holding means, and means for causing advancement and retraction of the shell-holding means.

7. In a button blanking machine, a main supporting and driving shaft, a pair of cages mounted thereon, each cage comprising a pair of supporting plates and a plurality of operative mechanisms carried upon the periphery thereof in spaced relation around the edges of said plates, the operative mechanisms of the two cages being related to each other, end to end, in cooperating pairs, the operative mechanisms of one cage including tubular supporting means, longitudinally reciprocable with reference to said plates and carrying shell-holding means which may be moved into and out of engagement with a shell adjacent the holding face of the shell-holding means, the operative mechanisms of the other cage including non-rotary tubular supporting means, rotary, tubular, supporting means extending therethrough and projecting therefrom at both ends, a longitudinally reciprocable, tubular, fluid-carrying, shell-holding means extending through said rotary, tubular, supporting means, and spring means for pressing the second shell-holding means toward the first shell-holding means, the rotary tubular means being provided at its forward end with a saw which is adapted to be rotated by the rotary tubular means in contact with a shell held by the first shell-holding means, and at its second end with means whereby it may be rotated.

8. A button blanking machine comprising, in combination, a main supporting and driving shaft, means for causing rotation of said shaft upon its axis, and a pair of cages fixedly securable to said shaft for rotation therewith, each of said cages comprising a pair of supporting plates and operative mechanisms supported thereby, each of the operative mechanisms of one cage being provided with means whereby it may be moved axially in one direction and actuating means for moving it in the opposite direction, the operative mechanisms of the other cage including rotary saws and reciprocable shell-holders, said shell-holders being provided with means whereby they may be automatically moved in one direction when pressure exerted by an operative mechanism of the other cage is relieved.

9. In a button blanking machine having horizontal shell-holders and a circular saw surrounding one of them and spaced therefrom at its forward end, a tubular member by which the saw is carried at its forward end, the forward end portion of the holder being pointed at its forward end and having diagonally arranged outlet ports connected with the hollow interior of said forward end portion whereby to permit fluid to be directed against the work at the point where work is being done, the external surface of said forward end portion fitting closely within said tubular member and having at least one spiral groove about its external surface to serve as means for preventing backward motion of fluid between the saw and the shell-holder.

10. A holding and cutting unit for a button blanking machine comprising a tubular member provided adjacent one end with a driving pulley and at its other end with a chuck for holding a circular saw having a shank, said tubular member having in its interior a tubular, fluid carrying, relatively reciprocable member, provided at one end with a shell-holder point, said shell-holder being provided near its forward end with diagonally arranged openings extending from the hollow interior of the shell-holder to the surface thereof and toward the cutting end of the saw, the external surface of the shell-holder being provided with at least one spiral groove so directed with relation to the direction of rotation of the saw as to cause fluid entering between the saw and the shell-holder to be moved forwardly toward the point of the shell-holder, the grooved part of the holder fitting closely within the saw shank so that the shell-holder and saw will be held against relative vibration.

11. A button blanking machine comprising a supporting frame, a main shaft carried by the frame, a pair of carriers connected with said shaft in axially spaced apart relation, a plurality of normally axially aligned cooperating pairs of supporting members, one group of members being mounted against rotation on one carrier and the other group of members mounted for rotation on the other carrier, the members of one group constituting work-holders, cutting means supported on each of the members of said second group and removable therefrom by axially outward movement relative to the associated carrier, each cutting means being in axial alignment with and closely adjacent the associated work-holder, and means for adjustably fixing one of said carriers to said main shaft and including means providing for rotatably shifting said one carrier relative to the associated carrier a distance sufficient to cause the removable cutting means to clear the associated work-holders, thereby providing for optional removal of said cutting means, as for replacement, sharpening, or the like.

12. A button blanking machine as defined in claim 11 in which said last named means comprises a plate fixed to said shaft, and bolt and slot means for adjustably fixing the rotatably adjustable carrier with reference thereto.

13. In a blanking machine, supporting means for supporting shell-holding means and a tubular tool in axially aligned relation, said shell-holding means being reciprocable toward and away from said tool, and a second shell-holding means reciprocable within said tool and normally projecting at one end beyond the tool and its supporting means, the second shell-holding means having a spring acting thereagainst at a point spaced from said tool for yieldably holding said one end protruding beyond said tubular tool, said spring being adapted to yield under pressure by the other shell-holder in excess of the pressure exerted by said spring, whereby to insure that there will not be excessive pressure exerted by the first mentioned shell-holder.

CLARENCE F. SCHMARJE.
RALPH A. McBRIDE.
CLAUS H. SCHMARJE.

REFERENCES CITED

The following references are of record in the file of this patent:

UNITED STATES PATENTS

| Number | Name | Date |
|---|---|---|
| 659,192 | Barry, Jr. | Oct. 2, 1900 |
| 766,014 | Barry, Jr., et al. | July 26, 1904 |
| 850,033 | Miller | Apr. 9, 1907 |
| 919,914 | Miller | Apr. 27, 1909 |
| 1,062,672 | Wallace | May 27, 1913 |
| 1,843,326 | Knott | Feb. 2, 1932 |
| 1,996,368 | Drissner | Apr. 2, 1935 |